(12) United States Patent
Hata et al.

(10) Patent No.: US 11,651,779 B2
(45) Date of Patent: May 16, 2023

(54) VOICE PROCESSING SYSTEM, VOICE PROCESSING METHOD, AND STORAGE MEDIUM STORING VOICE PROCESSING PROGRAM

(71) Applicant: SHARP KABUSHIKI KAISHA, Sakai (JP)

(72) Inventors: Noriko Hata, Sakai (JP); Fumiaki Sugimori, Sakai (JP); Tatsuya Nishio, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 171 days.

(21) Appl. No.: 17/230,187

(22) Filed: Apr. 14, 2021

(65) Prior Publication Data
US 2021/0350812 A1 Nov. 11, 2021

(30) Foreign Application Priority Data

May 8, 2020 (JP) .............................. JP2020-082358

(51) Int. Cl.
*G10L 21/0208* (2013.01)
*G10L 15/08* (2006.01)
(Continued)

(52) U.S. Cl.
CPC .......... *G10L 21/0208* (2013.01); *G10L 15/08* (2013.01); *G10L 25/78* (2013.01);
(Continued)

(58) Field of Classification Search
CPC ...... G06F 3/167; G06F 40/279; G06F 3/0488; G06F 40/289; G06Q 10/10; G10L 13/033; G10L 15/08; G10L 15/1822; G10L 15/19; G10L 15/22; G10L 15/26; G10L 21/0208; G10L 21/0216; G10L 21/10; G10L 25/30; G10L 25/54; G10L 25/60; G10L 25/63; G10L 25/78; G10L 2015/088; G10L 19/173; G10L 21/02; G10L 25/26;
(Continued)

(56) References Cited

U.S. PATENT DOCUMENTS 6,711,614 B1 * 3/2004 Suzuki .................... H04L 69/40
709/239
8,184,779 B2 * 5/2012 Lee ....................... H04M 3/5158
379/88.01
(Continued)

FOREIGN PATENT DOCUMENTS

JP 2018-106148 A 7/2018

*Primary Examiner* — Gerald Gauthier
(74) *Attorney, Agent, or Firm* — ScienBiziP, P.C.

(57) ABSTRACT

A voice processing system includes a voice receiver that receives voice spoken by users, a voice recognition unit that recognizes the voice received by the voice receiver, a voice determination unit that determines a state of transmission and reception of the voice between a first base and a second base based on a recognition result of the first voice received from the first base and a recognition result of the second voice received from the second base, and an information presenting unit that presents specific information for resolving an abnormal state of transmission and reception when it is determined by the voice determination unit that the state of transmission and reception is abnormal.

11 Claims, 11 Drawing Sheets

(51) Int. Cl.
*G10L 25/78* (2013.01)
*H04L 65/403* (2022.01)
*H04L 65/80* (2022.01)
*H04L 65/75* (2022.01)

(52) U.S. Cl.
CPC ............ H04L 65/403 (2013.01); H04L 65/75 (2022.05); H04L 65/80 (2013.01); *G10L 2015/088* (2013.01)

(58) Field of Classification Search
CPC ....... H04L 65/403; H04L 65/75; H04L 65/80; H04L 63/30; H04L 63/306; H04L 69/40; H04M 3/5158; H04M 3/002; H04N 7/147; H04N 7/15; H04N 13/183; H04N 21/4348; B64D 45/0031; G01R 33/3854; G07F 9/026; G11B 20/00934; H04B 17/15
See application file for complete search history.

(56) References Cited

U.S. PATENT DOCUMENTS

| | | | | |
|---|---|---|---|---|
| 8,655,659 | B2* | 2/2014 | Wang | G10L 13/033 704/277 |
| 2003/0008633 | A1* | 1/2003 | Bartosik | G06Q 10/10 455/406 |
| 2006/0074667 | A1* | 4/2006 | Saffer | G10L 15/26 704/E15.044 |
| 2009/0187407 | A1* | 7/2009 | Soble | G10L 15/26 704/E13.011 |
| 2011/0282667 | A1* | 11/2011 | Hernandez-Abrego | G10L 15/19 704/E15.005 |
| 2012/0140022 | A1* | 6/2012 | Kato | H04N 7/15 348/E7.083 |
| 2013/0094617 | A1* | 4/2013 | Shirosugi | H04N 21/4348 375/340 |
| 2013/0113883 | A1* | 5/2013 | Kanemaru | H04N 13/183 348/43 |
| 2013/0159003 | A1* | 6/2013 | Kim | G10L 25/54 704/E21.001 |
| 2014/0214415 | A1* | 7/2014 | Klein | G06F 3/167 704/231 |
| 2015/0120293 | A1* | 4/2015 | Wohlert | G10L 21/10 704/235 |
| 2016/0240213 | A1* | 8/2016 | Wen | G10L 25/63 |
| 2017/0093927 | A1* | 3/2017 | Seetharaman | H04L 63/30 |
| 2017/0237779 | A1* | 8/2017 | Seetharaman | H04L 63/306 726/30 |
| 2018/0077278 | A1* | 3/2018 | Fujieda | H04M 3/002 |
| 2018/0182383 | A1* | 6/2018 | Kim | G10L 15/22 |
| 2018/0182396 | A1 | 6/2018 | An | |
| 2018/0190310 | A1* | 7/2018 | Li | G10L 21/0216 |
| 2018/0374497 | A1* | 12/2018 | Furuta | G10L 25/30 |
| 2021/0027769 | A1* | 1/2021 | Qin | G10L 25/60 |
| 2021/0074298 | A1* | 3/2021 | Coeytaux | H04N 7/147 |
| 2021/0097990 | A1* | 4/2021 | Kim | G10L 15/1822 |
| 2021/0104242 | A1* | 4/2021 | Hashimoto | G06F 3/167 |
| 2021/0350812 | A1* | 11/2021 | Hata | H04L 65/403 |
| 2021/0358496 | A1* | 11/2021 | Sukumar | G10L 15/08 |

* cited by examiner

FIG. 4

| VOICE RECOGNITION OF OTHER BASE | PRESENCE OR ABSENCE OF DETECTED KEYWORD AT THIS BASE | SPEAKER SOUND VOLUME | BANDWIDTH STATUS | NOISE | HEARING STATE | TROUBLESHOOTING INFORMATION |
|---|---|---|---|---|---|---|
| NORMAL | NOT DETECTED | — | — | — | — | NONE |
| NORMAL | DETECTED | HIGH | — | HIGH | — | TROUBLESHOOTING INFORMATION 1 |
| NORMAL | DETECTED | HIGH | — | LOW | — | TROUBLESHOOTING INFORMATION 2 |
| NORMAL | DETECTED | LOW | — | HIGH | — | TROUBLESHOOTING INFORMATION 3 |
| NORMAL | DETECTED | LOW | — | LOW | — | TROUBLESHOOTING INFORMATION 4 |
| ABNORMAL | NOT DETECTED | — | — | — | — | NONE |
| ABNORMAL | DETECTED | — | SUFFICIENT | HIGH | — | TROUBLESHOOTING INFORMATION 5 |
| ABNORMAL | DETECTED | — | SUFFICIENT | LOW | — | TROUBLESHOOTING INFORMATION 6 |
| ABNORMAL | DETECTED | — | STRAINED | — | INTERMITTENT | TROUBLESHOOTING INFORMATION 7 |
| ABNORMAL | DETECTED | — | STRAINED | — | CANNOT HEAR AT ALL | TROUBLESHOOTING INFORMATION 8 |

DECISION INFORMATION (D2)

FIG. 5

| TROUBLESHOOTING INFORMATION | TROUBLESHOOTING MESSAGE | |
|---|---|---|
| | THIS BASE | OTHER BASE |
| TROUBLESHOOTING INFORMATION 1 | — | "STATUS: HARD TO HEAR SOUND AT THIS BASE" "PLEASE ENABLE NOISE CANCELING" |
| TROUBLESHOOTING INFORMATION 2 | "ADJUST EQUALIZER?" | "STATUS: HARD TO HEAR SOUND AT THIS BASE" "PLEASE RAISE MICROPHONE GAIN" |
| TROUBLESHOOTING INFORMATION 3 | "PLEASE CHECK SPEAKER SOUND VOLUME" | "STATUS: HARD TO HEAR SOUND AT THIS BASE" "PLEASE ENABLE NOISE CANCELING" |
| TROUBLESHOOTING INFORMATION 4 | "PLEASE CHECK SPEAKER SOUND VOLUME" | "STATUS: HARD TO HEAR SOUND AT THIS BASE" |
| TROUBLESHOOTING INFORMATION 5 | — | "STATUS: HARD TO HEAR SOUND AT THIS BASE" "PLEASE RAISE MICROPHONE GAIN" |
| TROUBLESHOOTING INFORMATION 6 | — | "STATUS: HARD TO HEAR SOUND AT THIS BASE" "PLEASE RAISE MICROPHONE GAIN" |
| TROUBLESHOOTING INFORMATION 7 | "REDUCE VIDEO QUALITY?" | "STATUS: HARD TO HEAR SOUND AT THIS BASE" "REDUCE SAMPLING RATE OF VOICE?" |
| TROUBLESHOOTING INFORMATION 8 | "PLEASE CHECK INTERNET CONNECTION" | "STATUS: HARD TO HEAR SOUND AT THIS BASE" "PLEASE CHECK INTERNET CONNECTION" |

D3

VOICE PROCESSING SYSTEM, VOICE PROCESSING METHOD, AND STORAGE MEDIUM STORING VOICE PROCESSING PROGRAM

INCORPORATION BY REFERENCE

This application is based upon and claims the benefit of priority from the corresponding Japanese Patent Application No. 2020-082358 filed on May 8, 2020, the entire contents of which are incorporated herein by reference.

BACKGROUND OF THE INVENTION

Field of the Invention

The present disclosure relates to a voice processing system, a voice processing method, and a storage medium storing a voice processing program.

Description of the Background Art

Conventionally, a conferencing system has been proposed in which voice, video, files, and the like are transmitted and received via a network at locations separated from each other. For example, Japanese Patent No. 6463825 discloses a technique for displaying text recognizing voice of a speaker and a video of the speaker on a display unit in a conferencing system.

However, in a conventional conferencing system, trouble with the voice, such as interruption of a voice call, may occur due to a network bandwidth shortage, latency, or a malfunction of a microphone or a speaker. Further, when trouble with the voice occurs, it is difficult to specify the cause of the trouble with the voice corresponding to the trouble with the voice occurs is delayed, which is a problem.

SUMMARY OF THE INVENTION

An object of the present disclosure is to provide a voice processing system, a conferencing system, a voice processing method, and a storage medium storing a voice processing program capable of detecting trouble with the voice and presenting a troubleshooting approach for the trouble with the voice.

A voice processing system according to an embodiment of the present disclosure transmits and receives voice spoken by users in a first base and a second base connected via a network. The voice processing system includes a voice receiver that receives the voice, a voice recognition unit that recognizes the voice received by the voice receiver, a voice determination unit that determines a state of transmission and reception of the voice between a first base and a second base, based on a recognition result of the first voice received from the first base and a recognition result of the second voice received from the second base, and an information presenting unit that presents specific information for resolving an abnormal state of transmission and reception when it is determined by the voice determination unit that the state of transmission and reception is abnormal.

A voice processing method according to another embodiment of the present disclosure is a voice processing method by which voice spoken by users is transmitted and received in a first base and a second base connected via a network, the voice processing method, by one or more processors, being to: receive the voice; recognize the voice received; determine a state of transmission and reception of the voice between the first base and the second base based on a recognition result of a first voice received from the first base and a recognition result of a second voice received from the second base; and when it is determined that the state of transmission and reception is abnormal, present specific information for resolving the abnormal state of transmission and reception.

A storage medium according to another embodiment of the present disclosure is a storage medium storing a voice processing program by which voice spoken by users is transmitted and received in a first base and a second base connected via a network, the voice processing program, by one or more processors, being to: receive the voice, recognize the voice received, determine a state of transmission and reception of the voice between the first base and the second base based on a recognition result of a first voice received from the first base and a recognition result of a second voice received from the second base, and when it is determined that the state of transmission and reception is abnormal, present specific information for resolving the abnormal state of transmission and reception.

In the present disclosure, a voice processing system, a voice processing method, and a storage medium storing a voice processing program capable of detecting trouble with the voice and presenting a troubleshooting approach for the trouble with the voice is provided.

BRIEF DESCRIPTION OF THE DRAWINGS

FIG. 4 is a diagram showing an example of determination information used in the conferencing system according to an embodiment of the present disclosure.

FIG. 5 is a diagram showing an example of feedback information used in the conferencing system according to an embodiment of the present disclosure.

DESCRIPTION OF THE PREFERRED EMBODIMENTS

Hereinafter, embodiments of the present disclosure will be explained with reference to the accompanying drawings. The following embodiment represents an example of an implementation of the present disclosure, and does not limit the technical scope of the present disclosure.

The voice processing system according to the present disclosure can be applied to a remote conference in which a plurality of bases (areas) are connected to a network and a plurality of users participate. For example, the voice processing system transmits and receives voice spoken by users in a first base and a second base connected via a network. Further, the voice processing system according to the present disclosure may also have a function that executes a voice command and a call function (telephone function, videophone function, etc.) capable of making a call between users via a network. In addition, the voice processing system according to the present disclosure includes one or more voice processing devices that transmit and receive voice of the conference participants.

In the following embodiment, a case where the voice processing system is applied to a remote conference (conferencing system) will be explained as an example. That is to say, a conferencing system according to the present embodiment is an example of the voice processing system according to the present disclosure. For example, in the conferencing system according to the present embodiment, by placing a voice processing device in each base (conference room), and causing the voice processing device in one conference room to receive voice spoken by a user and then transmit the audio to the voice processing device in the other conference rooms, a conversation between users in various conference rooms is made possible. Further, the conferencing system includes a display device that displays the content of the conversation (text information), materials for the conference, and the like. Further, the conferencing system includes a cloud server that analyzes voice of a user received from the voice processing device and specifies commands.

Conference System 100

Figure 1:
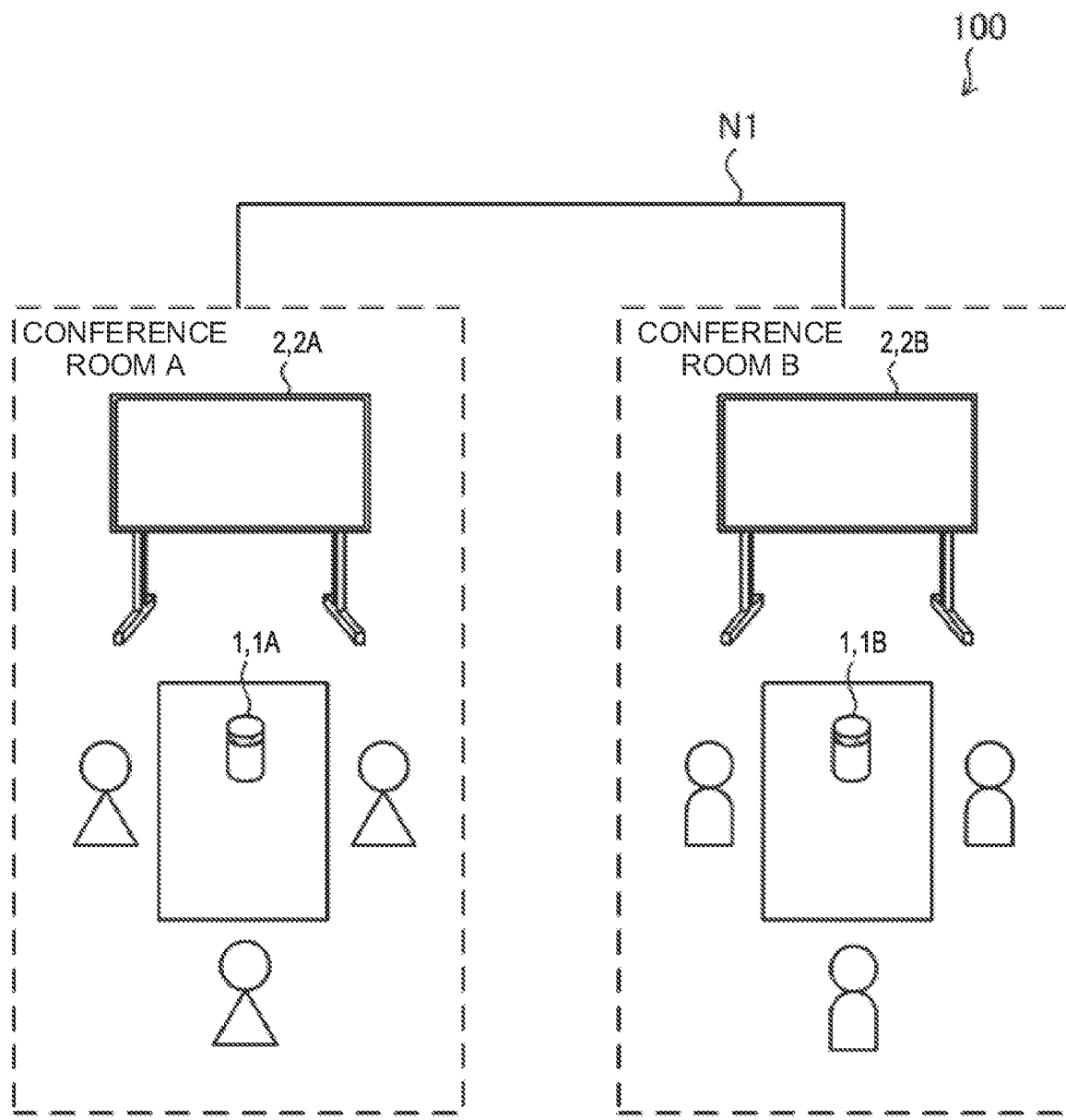
FIG. 1 is a diagram showing a schematic configuration of a conferencing system according to an embodiment of the present disclosure.

FIG. 1 is a diagram showing a schematic configuration of a conferencing system according to an embodiment of the present disclosure. The conferencing system 100 includes a voice processing device 1 and a display device 2 at each base (conference room). Voice processing devices 1A and 1B are each a microphone-speaker device including a microphone and a speaker, such as an AI speaker or a smart speaker. Here, the voice processing device 1A installed in a conference room A and the voice processing device 1B installed in a conference room B are shown. Display devices 2A, and 2B include a display unit that displays various information. Here, the display device 2A installed in a conference room A and the display device 2B installed in a conference room B are shown. The voice processing device 1A and the display device 2A, as well as the voice processing device 1B and the display device 2B are connected to each other via the network N1. The network N1 is a communications network such as the Internet, LAN, WAN, or public telephone line. Each of the voice processing devices 1A and 1B is an example of the voice processing device of the present disclosure. The display devices 2A and 2B are each an example of a display device of the present disclosure. Further, the display device 2B is an example of the first display panel of the present disclosure, and the display device 2A is an example of the second display panel of the present disclosure.

The conferencing system 100, for example, receives voice spoken by a user of the conference room A from the voice processing device 1A, and communicates the voice received from the voice processing device 1A via a network N1 to the voice processing device 1B of the conference room B. The voice processing device 1B outputs the voice received from the voice processing device 1A from the speaker and displays the content of the voice (text information) on the display device 2B. In the same way, for example, voice spoken by a user of the conference room B is received by the voice processing device 1B and the voice received by the voice processing device 1B is communicated via the network N1 to the voice processing device 1A of the conference room A. The voice processing device 1A outputs the voice received from the voice processing device 1B from the speaker, and causes the display device 2A to display the content of the relevant voice (text information). In this way, the users of each of the conference rooms A and B are able to have a conversation.

Here, in the conferencing system 100, trouble with the voice, such as interruption of a voice call, may occur due to a network bandwidth shortage, latency, or a malfunction of a microphone or a speaker. When trouble with the voice occurs, the conferencing system 100 can detect the trouble with the voice and present a troubleshooting approach for the trouble with the voice. Hereinafter, a specific configuration of the conferencing system 100 will be explained. In the following description, when the voice processing devices 1A, and 1B are not distinguished, they are referred to as "voice processing devices 1".

Voice Processing Devices 1

Figure 2:
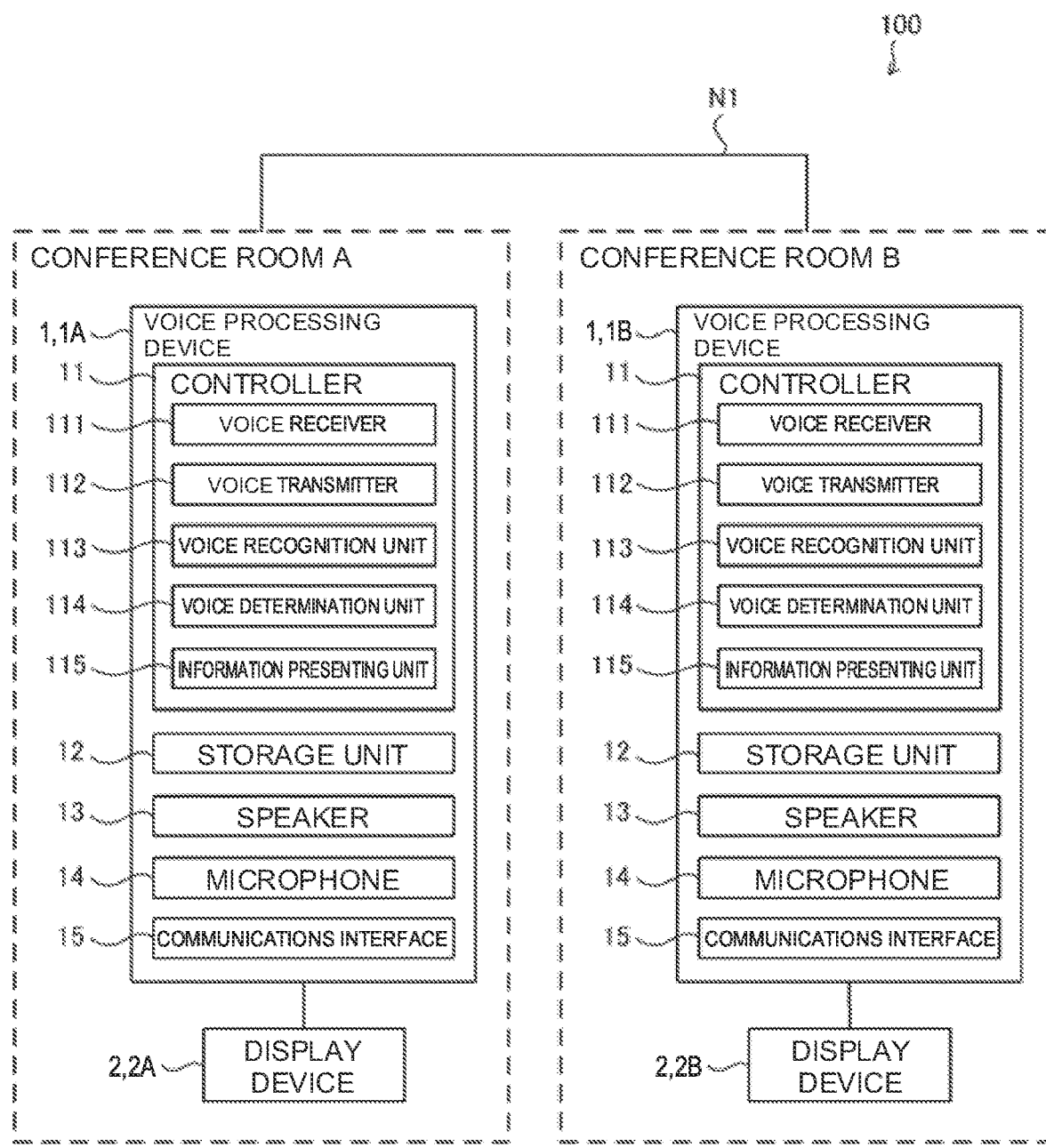
FIG. 2 is a functional block diagram illustrating a configuration of a conferencing system according to an embodiment of the present disclosure.

The voice processing devices 1 placed in each base (here, conference rooms A and B) have the same configuration. As shown in FIG. 2, the voice processing device 1 includes a controller 11, a storage unit 12, a speaker 13, a microphone 14, a communications interface 15, and the like. The voice processing device 1 may be a device such as an AI speaker or a smart speaker. The voice processing device 1 is, for example, placed on a desk in a conference room, acquires voice of a user participating in a conference via the microphone 14, and outputs (relays) voice to the relevant user from the speaker 13.

The communications interface 15 connects a voice processing device 1 by wire or wirelessly to a network N1, and connects with another device (for example, another voice processing device 1, a display device 2, a cloud server, etc.) via the network N1, and is a communications interface for executing data communication between the communications interface 15 and the other device according to a predetermined communication protocol.

The storage unit 12 is a non-transitory (non-volatile) storage unit such as flash memory storing various type of information. In the storage unit 12, a control program such as an information presentation processing program is stored that causes the controller 11 to perform information presentation processing (see FIG. 9). For example, the information presentation processing program is distributed from an external server and stored. For example, the information presentation processing program may be recorded non-temporarily on a computer-readable recording medium such as a CD or a DVD, read by a reading device (not illustrated)

such as a CD drive or a DVD drive provided in the voice processing device 1, and stored in the storage unit 12.

Figure 3:
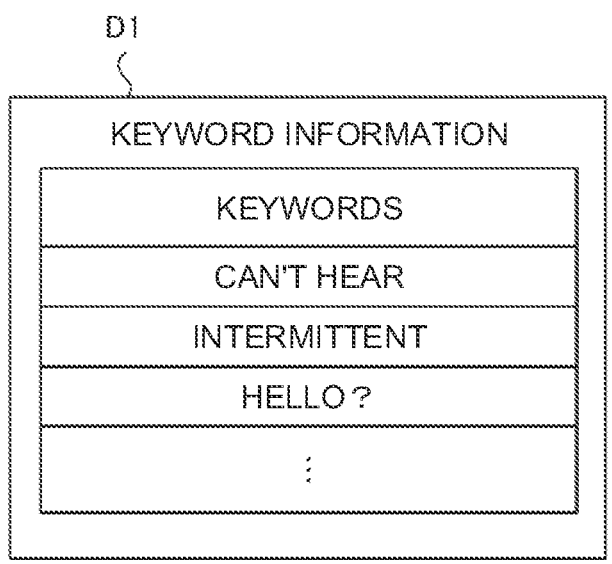
FIG. 3 is a table showing an example of keyword information used in the conferencing system according to an embodiment of the present disclosure.

Further, in the storage unit 12, data such as keyword information D1, determination information D2, and troubleshooting information D3 is stored. FIG. 3 is a diagram showing an example of the keyword information D1. FIG. 4 is a diagram showing an example of the determination information D2. FIG. 5 is a diagram showing an example of the troubleshooting information D3.

A specific keyword set in advance (corresponding to a specific word in the present disclosure) is registered in the keyword information D1. Specifically, the keyword is a phrase meaning there is difficulty in hearing or understanding voice spoken in a remote area. For example, the keywords include phrases such as "can't hear", "intermittent", and "hello?". Phrases with the same meaning, synonyms, and the like, of the term may be registered in the keywords. For example, phrases such as "I didn't get that" and "it is hard to hear" corresponding to "can't hear" may be registered in the keywords. The keyword is registered in the keyword information D1 in advance.

For when the trouble with the voice occurs, information for specifying a troubleshooting approach for the trouble with the voice is recorded in the determination information D2. Specifically, the determination information D2 includes the recognition result of the voice received from another base ("normal" or "abnormal"), information on whether the keyword is detected at its own base (presence or absence detected), speaker sound volume at its own base {"high" (set value greater than or equal to 50% of the maximum sound volume value) or "low" (set value is less than 50% of the maximum sound volume value)"}, network bandwidth status between its own base and another base {"sufficient" (1.5 Mbps or more) or "strained" (less than 1.5 Mbps)}, noise level {"high" (SNR, signal to noise ratio, is less than 0 dB) or "low" (SNR is greater than or equal to 0 dB)"}, hearing state ("intermittent" or "cannot hear at all"), identifying information of the troubleshooting information related to the troubleshooting method (troubleshooting information 1 to 8). The determination information D2 includes this information and the like, registered in association with one another.

Specific content is registered in the troubleshooting information D3 for the troubleshooting information 1 to 8, which are registered in the determination information D2. Each piece of troubleshooting information includes at least a troubleshooting message presented (notified) in another base. The troubleshooting message has content relating to a troubleshooting approach (solution) for resolving the trouble with the voice. In this way, in the storage unit 12, a troubleshooting message related to a status for each item included in the determination information D2 (an example of the specific information of the present disclosure) is stored in advance.

The controller 11 includes control devices such as a CPU, ROM, and RAM. The CPU is a processor that executes various types of arithmetic processes. The ROM includes a control program stored in advance, such as BIOS and OS for causing the CPU to execute various types of processes. The RAM stores various information and is used as temporary storage memory (work area) for the various processing executed by the CPU. The controller 11 controls the voice processing device 1 by causing the CPU to execute various types of control programs stored in advance in the ROM or the storage unit 12.

Specifically, the controller 11 includes various processing units such as a voice receiver 111, a voice transmitter 112, a voice recognition unit 113, a voice determination unit 114, and an information presenting unit 115. The controller 11 functions as the various types of processing units by causing the CPU to execute various types of processes according to the control program. Furthermore, some or all of the processing units included in the controller 11 may be configured by an electronic circuit. The information presentation processing program may be a program for causing a plurality of processors to function as the various types of processing units.

The voice receiver 111 receives the voice (voice data) spoken by the user who uses the voice processing device 1. The voice receiver 111 is an example of a voice receiver of the present disclosure. For example, the voice receiver 111 of the voice processing device 1A receives the voice spoken by the user of the conference room A, and the voice receiver 111 of the voice processing device 1B receives the voice spoken by the user of the conference room B.

The voice transmitter 112 transmits the voice (voice data) received from the voice receiver 111 to a remote area (another base). For example, the voice transmitter 112 of the voice processing device 1A transmits the voice spoken by the user of the conference room A to the voice processing device 1B of the conference room B, and the voice transmitter 112 of the voice processing device 1B transmits the voice spoken by the user of the conference room B to the voice processing device 1A in the conference room A.

The voice recognition unit 113 recognizes voice received from the voice receiver 111. The voice recognition unit 113 is an example of the voice recognition unit of the present disclosure. For example, the voice recognition unit 113 of the voice processing device 1A recognizes the voice spoken by the user of the conference room B received by the voice receiver 111 of the voice processing device 1A and converts the voice into text data. As a further example, the voice recognition unit 113 of the voice processing device 1B recognizes the voice spoken by the user of the conference room A received by the voice receiver 111 of the voice processing device 1B and converts the voice into text data.

Here, the voice recognition unit converts the voice data of voice spoken by a user into to character string. Further, the voice recognition may include processing of pattern matching of the converted character string and words registered in a dictionary database.

Further, the voice recognition unit 113 causes the voice to be output from the speaker 13. For example, the voice recognition unit 113 of the voice processing device 1A outputs the voice spoken by the user of the conference room B from the speaker 13 of the conference room A. As another example, the voice recognition unit 113 of the voice processing device 1B outputs the voice spoken by the user of the conference room A from the speaker 13 of the conference room B.

Further, the voice recognition unit 113 causes the text information corresponding to the text data to display on the display device 2. For example, the voice recognition unit 113 of the voice processing device 1A causes text information corresponding to the voice spoken by the user of the conference room B to be displayed on the display device 2A of the conference room A As a further example, the voice recognition unit 113 of the voice processing device 1B causes text information corresponding to the voice spoken by the user of the conference room A to be displayed on the display device 2B of the conference room B.

The voice determination unit 114 determines the state of transmission and reception of the voice of the first base and the second base based on the recognition result of the first voice received from the first base and the recognition result of the second voice received from the second base. Specifically, the voice determination unit 114 determines the state of transmission and reception of the voice between the conference room A and the conference room B based on the recognition result of the voice spoken by a user of the conference room A and the recognition result of the voice spoken by the user of the conference room B.

Figure 6:
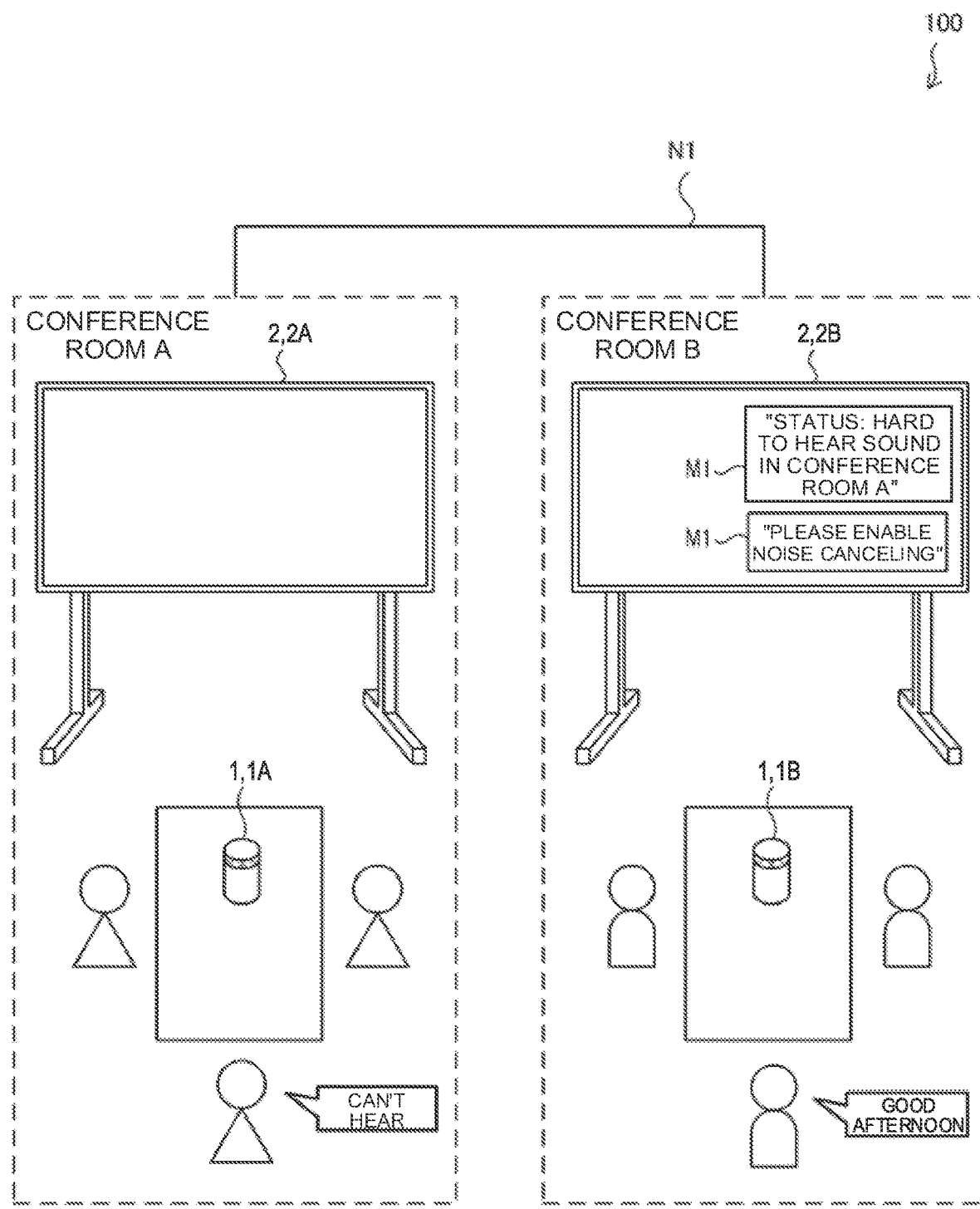
FIG. 6 is a diagram showing an example of a display screen displayed on a display device of a conferencing system according to an embodiment of the present disclosure.

For example, the voice determination unit 114 of the voice processing device 1A determines that the state of transmission and reception is abnormal when one word corresponding to voice from the user of conference room B is recognized by the voice recognition unit 113, and when a specific keyword set in advance (see FIG. 3) corresponding to the voice of the user of the conference room A by the voice recognition unit 113 is recognized. For example, as shown in FIG. 6, the user of the conference room B says "Good afternoon" (the first word) and the user of the conference room A says "can't hear" (the keyword), and when the voice recognition unit 113 of the voice processing device 1A recognizes the first word and the keyword, the voice determination unit 114 determines that the state of transmission and reception is abnormal. In this case, for example, in the conference room A, a problem occurs in that the first word "Good afternoon" is displayed as text information on the display device 2A, and the first word is not output from the speaker 13 as normal.

Further, the voice determination unit 114 determines the state of transmission and reception is abnormal when, without recognizing one word corresponding to the voice of the user of the conference room B by the voice recognition unit 113, a specific keyword set in advance (see FIG. 3) corresponding to the voice of the user of the conference room A by the voice recognition unit 113 is recognized. For example, as shown in FIG. 6, the user of the conference room B says "Good afternoon" (the first word) and the user of the conference room A says "can't hear" (the keyword), and when the voice recognition unit 113 of the voice processing device 1A cannot recognize the first word and does recognize the keyword, the voice determination unit 114 determines that the state of transmission and reception is abnormal. In this case, for example, in the conference room A, a problem occurs in that the first word "Good afternoon" is not displayed as text information on the display device 2A, and the first word is not output from the speaker 13 as normal.

Here, from whether voice recognition unit 113 has converted the voice data of the voice spoken by the user into a character string, the voice determination unit 114 determines whether the voice was recognized. The voice determination unit 114 determines that the voice can be recognized when the voice data is converted into a character string. Further, the voice determination unit 114 may determine that the voice can be recognized when the converted character string makes a word that is registered in the dictionary database.

Further, the voice determination unit 114 determines the volume of the speaker 13 of its own base (volume setting), the network bandwidth status between its own base and another base, the amount of noise in the voice received from the other base, and the hearing state of the voice received from the other base. For example, the voice determination unit 114 determines whether or not the set sounds volume of the speaker 13 of the voice processing device 1A is 50% or more of the maximum value. Further, the voice determination unit 114 determines whether the network bandwidth between the conference room A and the conference room B is sufficient (the transmitted and received data amount is greater than or equal to 1.5 Mbps). Further, the voice determination unit 114 determines whether the amount of noise in the voice received from the conference room B is high (SNR is less than 0 dB). Further, the voice determination unit 114 determines whether the hearing state of the voice received from the conference room B is "intermittent" or "cannot hear at all".

Here, for example, when the voice recognition unit 113 converts the voice data of the voice spoken by the user into a character string and the converted character string is not registered in a dictionary database, the voice determination unit 114 may determine that the hearing state is "intermittent". For example, when the voice recognition unit 113 has recognized "good" and "af", in the converted voice data, these character strings are not registered the dictionary database. Further, based on "good" and "af" the voice determination unit 114 is able to predict "good afternoon" by referring to the dictionary database. In this way, the voice determination unit 114 determines that the hearing state is "intermittent" when a part is not recognized of a predicted word based on a character string recognized from the voice.

When the voice determination unit 114 determines that the state of transmission and reception is abnormal, the information presenting unit 115 presents a troubleshooting message (specific information) for resolving the abnormal state of transmission and reception. Specifically, the information presenting unit 115 refers to the determination information D2, specifies the troubleshooting information corresponding to the determination result of the voice determination unit 114, further refers to the troubleshooting information D3, and acquires and presents a troubleshooting message corresponding to the troubleshooting information to the user.

For example, the information presenting unit 115 of the voice processing device 1A presents a troubleshooting message in the conference room based on the sound volume of the speaker 13 of the voice processing device 1A and the amount of noise in the voice of the user in the conference room B received by the voice processing device 1A. For example, the information presenting unit 115 of the voice processing device 1A presents, in the conference room B, a troubleshooting message based on at least either of the sound volume of the speaker 13 of the voice processing device 1A and the amount of noise in the voice of the user in the conference room B received by the voice processing device 1A.

As a further example, the information presenting unit 115 of the voice processing device 1A presents a troubleshooting message in the conference room B based on the network bandwidth status between the conference room A and conference room B, and the amount of noise in the voice of the user of the conference room B received by the voice processing device 1A. The information presenting unit 115 of the voice processing device 1A may present, in the conference room B, a troubleshooting message based on at least either of the network bandwidth status between the conference room A and conference room B, and the amount of noise in the voice of the user of the conference room B received by the voice processing device 1A.

The information presenting unit 115 causes the troubleshooting message to display on the display device 2B provided in the conference room B. Further, the information presenting unit 115 may cause the same troubleshooting message or a different troubleshooting message as the display device 2B provided in the conference room B to display on the display device 2A provided in the conference room A.

Information Presentation Processing

Figure 9:
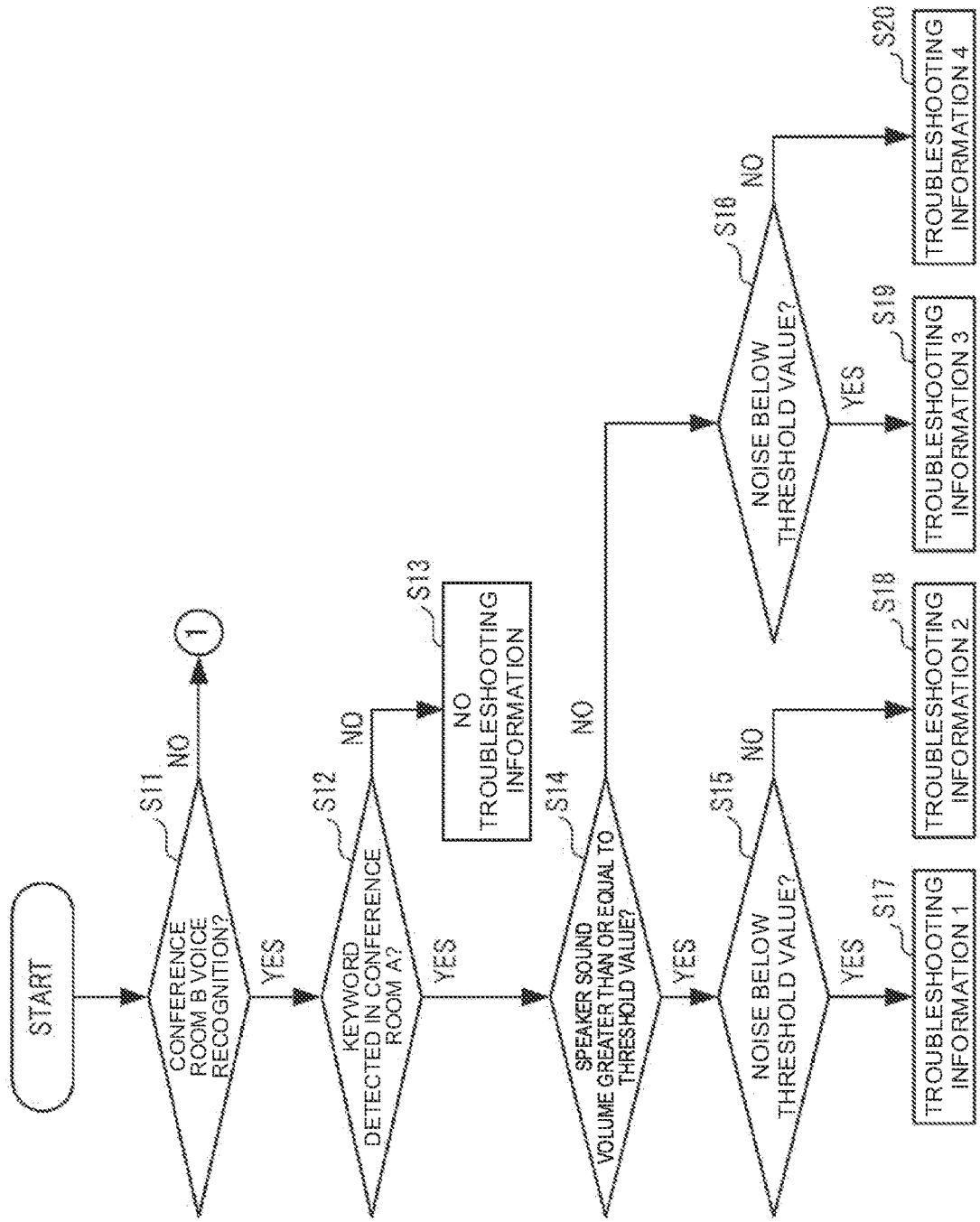
FIG. 9 is a flowchart for explaining an example of a procedure of information presentation processing in the conferencing system according to the embodiment of the present disclosure.

Hereinafter, with reference to FIG. 9, an example of the procedure of the information presentation processing performed by the controller 11 of the voice processing device 1 will be described. Here, in the conferencing system 100 shown in FIG. 1, the information presentation processing performed by the controller 11 of the voice processing device 1A will be described. For example, the controller 11 of the voice processing device 1A starts the execution of the information presentation processing program by starting the conferencing system, thereby starting the information presentation processing. The information presentation processing is executed individually and in parallel in each of the voice processing devices 1A, and 1B.

The present disclosure can be regarded as a disclosure of a voice processing method in which one or more steps included in information presentation processing are performed. Further, one or more steps included in the information presentation processing described here may be omitted where appropriate. Again, each of the steps in the information presentation processing may be executed in a different order as long as a similar operation and effect is obtained. Additionally, though in the example described here, each step in the information presentation processing is executed by the controller 11, in another embodiment, each step in the information presentation processing may be divided and processed by one or a plurality of processors.

Figure 10:
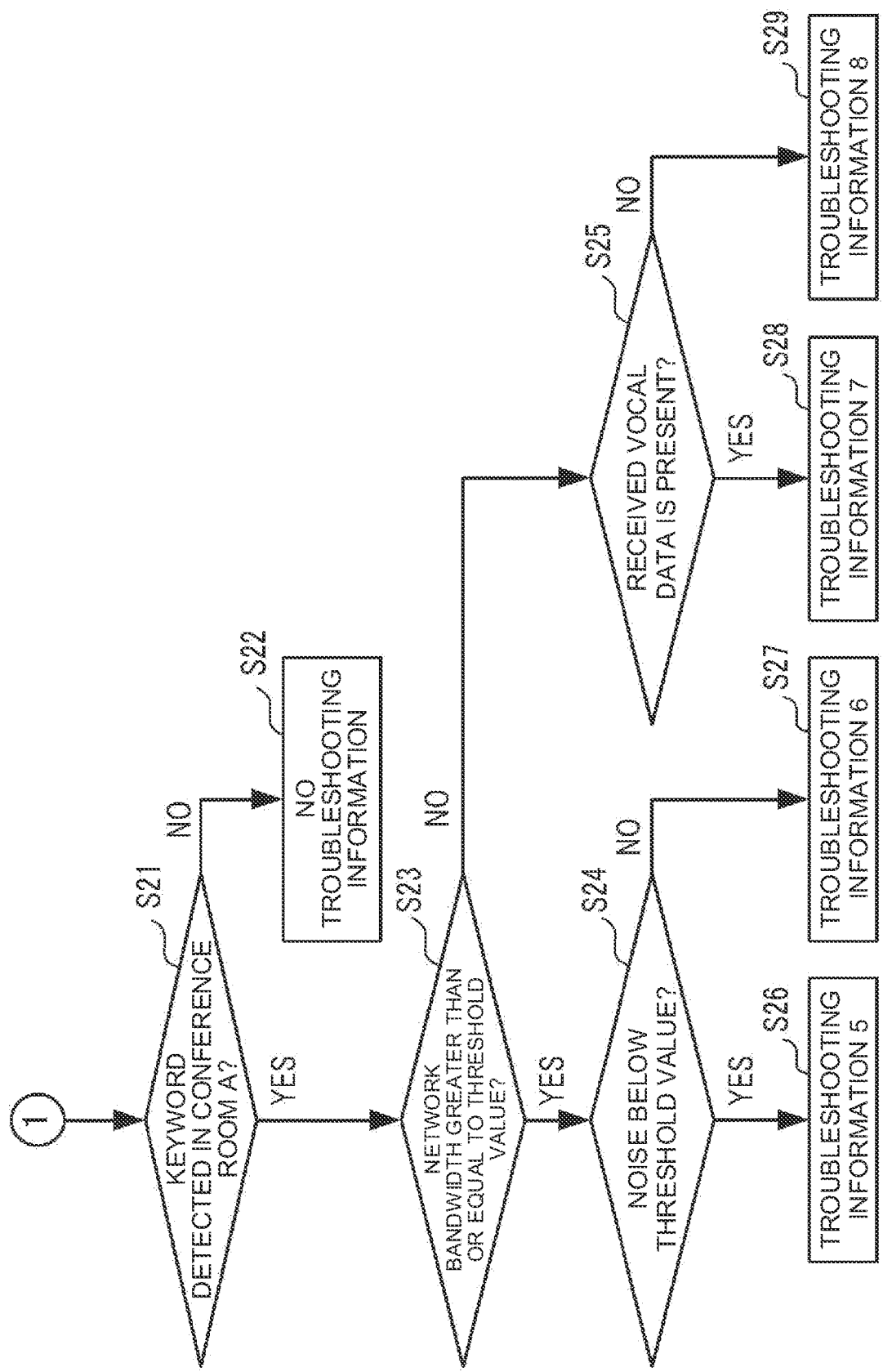
FIG. 10 is a flowchart for explaining an example of a procedure of information presentation processing in the conferencing system according to the embodiment of the present disclosure.

In step S11, the controller 11 of the voice processing device 1A determines whether the voice spoken by the user of the conference room B is recognized. When the controller 11 recognizes the voice of the user in the conference room B (S11: YES), the process proceeds to step S12. When the controller 11 cannot recognize the voice of the user in the conference room B (S11: NO), the process proceeds to step S21 (see FIG. 10). Step S11 is one example of the voice recognition step of the present disclosure.

In step S12, the controller 11 of the voice processing device 1A determines whether the keyword, registered in the keyword information D1 (see FIG. 3), from the user in the conference room A has been recognized (detected). If the controller 11 does not acquire a keyword (S12: NO), the processing proceeds to step S13. If the controller 11 does acquires a keyword (S12: YES), the processing proceeds to step S14. That is, when the controller 11 does not recognize the keyword (S12: NO), the controller 11 determines that the state of transmission and reception of the voice between the conference room A and the conference room B is normal, and when the controller 11 recognizes the keyword (S12: YES), the controller 11 determines that the state of transmission and reception of the voice between the conference room A and the conference room B is abnormal.

In step S13, the controller 11 of the voice processing device 1A determines that the state of transmission and reception of the voice between the conference room A and the conference room B is normal, and does not perform the information presentation processing for the troubleshooting message. In this case, the voice of the conference room A and the voice of the conference room B are being sent and received normally.

In step S14, the controller 11 of the voice processing device 1A determines whether the set sound volume of the speaker 13 of the voice processing device 1A is greater than or equal to a threshold value (for example, 50% of the maximum value). When the set sound volume is greater than or equal to the threshold value (S14: YES), the process proceeds to step S15. When the set sound volume is less than the threshold value (S14: NO), the process proceeds to step S16.

In step S15, the controller 11 of the voice processing device 1A determines whether the noise in the voice (SNR) received from the conference room B is less than a threshold value (for example, 0 dB). When the noise (SNR) is less than the threshold value (0 dB) (S15: YES), the process proceeds to step S17. When the noise (SNR) is greater than or equal to the threshold value (0 dB) (S15: NO), the process proceeds to step S18.

In step S16, the controller 11 of the voice processing device 1A determines in the same way as in step S15 whether the noise in the voice (SNR) received from the conference room B is less than a threshold value (0 dB). When the noise (SNR) is less than the threshold value (0 dB) (S16: YES), the process proceeds to step S19. When the noise (SNR) is greater than or equal to the threshold value (0 dB) (S16: NO), the process proceeds to step S20. Steps S12 to S16 are examples of the voice determination step of the present disclosure.

In steps S17 to S20, the controller 11 of the voice processing device 1A presents a troubleshooting message for resolving the abnormal state of transmission and reception of voice between the conference room A and the conference room B. Steps S17 to S20 are examples of the information presentation steps of the present disclosure.

For example, in step S17, the controller 11 of the voice processing device 1A refers to the determination information D2 and the troubleshooting information D3, and causes the display device 2B of the conference room B to display a troubleshooting message M1 corresponding to the troubleshooting information 1 (see FIG. 6).

Figure 7:
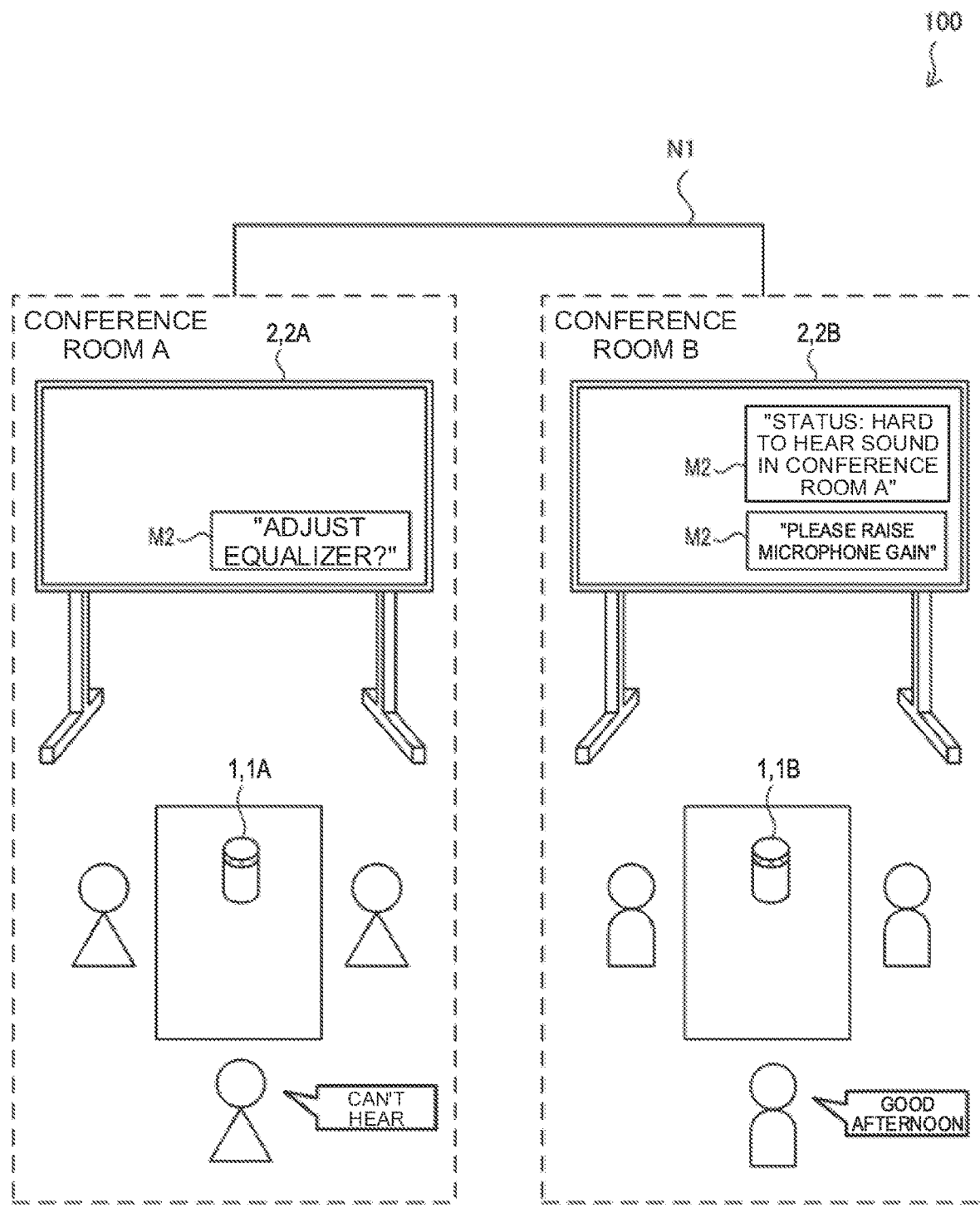
FIG. 7 is a diagram showing an example of a display screen displayed on a display device of a conferencing system according to an embodiment of the present disclosure.

For example, in step S18, the controller 11 of the voice processing device 1A refers to the determination information D2 and the troubleshooting information D3, and causes the display device 2A of the conference room A and the display device 2B of the conference room B to display a troubleshooting message M2 corresponding to the troubleshooting information 2 (see FIG. 7).

For example, in step S19, the controller 11 of the voice processing device 1A refers to the determination information D2 and the troubleshooting information D3, and causes the display device 2A of the conference room A and the display device 2B of the conference room B to display a troubleshooting message corresponding to the troubleshooting information 3.

For example, in step S20, the controller 11 of the voice processing device 1A refers to the determination information D2 and the troubleshooting information D3, and causes the display device 2A of the conference room A and the display device 2B of the conference room B to display a troubleshooting message corresponding to the troubleshooting information 4.

Here, in step S11, when the controller 11 of the voice processing device 1A cannot recognize the voice of the user of the conference room B (S11: NO), in step S21 (see FIG. 10) the controller 11 of the voice processing device 1A determines whether the keyword the keyword registered the keyword information D1 (see FIG. 3) from the user in the conference room A has been recognized (detected). If the controller 11 does not acquire a keyword (S21: NO), the processing proceeds to step S22. If the controller 11 does acquires a keyword (S21: YES), the processing proceeds to step S23. The controller 11 does not present a troubleshooting message when a keyword is not recognized (S21: NO), since it is difficult to specify the cause of the trouble with the voice. In this case, the controller 11 may display a message on the display device 2A of the conference room A and the display device 2B of the conference room B indicating that trouble with the voice has occurred.

In step S23, the controller 11 of the voice processing device 1A determines whether the network bandwidth (transmitted and received data amount) between the conference room A and the conference room B is greater than or equal to a threshold value (for example, 1.5 Mbps) When the network bandwidth (transmitted and received data amount) is greater than or equal to the threshold value (S23: YES), the process proceeds to step S24. When the network bandwidth (transmitted and received data amount) is greater than or equal to the threshold value (S23: NO), the process proceeds to step S25.

In step S24, the controller 11 of the voice processing device 1A determines in the same way as in step S15 whether the noise in the voice (SNR) received from the conference room B is less than a threshold value (0 dB). When the noise (SNR) is less than the threshold value (0 dB) (S24: YES), the process proceeds to step S26. When the noise (SNR) is greater than or equal to the threshold value (0 dB) (S24: NO), the process proceeds to step S26.

In step S25, the controller 11 of the voice processing device 1A determines whether or not the hearing state of received sound of the state of voice received from the conference room B is "intermittent" or "cannot hear at all", for example, the controller 11 determines if received vocal data exists. When received voice data from the conference room B exists, (when the hearing condition is "intermittent"), the process proceeds to step S28. When no received voice data from the conference room B exists, (when the hearing state is "cannot hear at all"), the process proceeds to step S29. Steps S21 to S25 are examples of the voice determination steps of the present disclosure.

In steps S26 to S29, the controller 11 of the voice processing device 1A presents a troubleshooting message for resolving the abnormal the state of transmission and reception of voice between the conference room A and the conference room B. Steps S26 to S29 are examples of the information presentation steps of the present disclosure.

For example, in step S26, the controller 11 of the voice processing device 1A refers to the determination information D2 and the troubleshooting information D3, and causes the display device 2B of the conference room B to display a troubleshooting message corresponding to the troubleshooting information 5.

For example, in step S27, the controller 11 of the voice processing device 1A refers to the determination information D2 and the troubleshooting information D3, and causes the display device 2B of the conference room B to display a troubleshooting message corresponding to the troubleshooting information 6.

For example, in step S28, the controller 11 of the voice processing device 1A refers to the determination information D2 and the troubleshooting information D3, and causes the display device 2A of the conference room A and the display device 2B of the conference room B to display a troubleshooting message corresponding to the troubleshooting information 7.

For example, in step S29, the controller 11 of the voice processing device 1A refers to the determination information D2 and the troubleshooting information D3, and causes the display device 2A of the conference room A and the display device 2B of the conference room B to display a troubleshooting message corresponding to the troubleshooting information 8.

The conferencing system 100 executes the information presentation processing in the manner described above. As described above, the conferencing system 100 according to the present embodiment determines the state of transmission and reception of the voice between the first base and the second base based on the recognition result of the first voice received from the first base and the recognition result of the second voice received from the second base, and when the state of transmission and reception is abnormal, the conferencing system 100 presents specific information for resolving the abnormal state of transmission and reception. Specifically, the conferencing system 100 presents specific information according to a combination of the result showing whether the first voice was recognized and the content of an acquired word by recognizing the second voice. As a result, when trouble with the voice, such as interruption of a voice call, occurs due to a network bandwidth shortage, latency, a malfunction of a microphone or a speaker, or the like, the cause of the trouble with the voice can be specified and specific information is presented to the user for solving the trouble with the voice. The user acquires the specific information and performs operations to solve the trouble with the voice. Therefore, it is possible to solve the trouble with the voice quickly.

Figure 8:
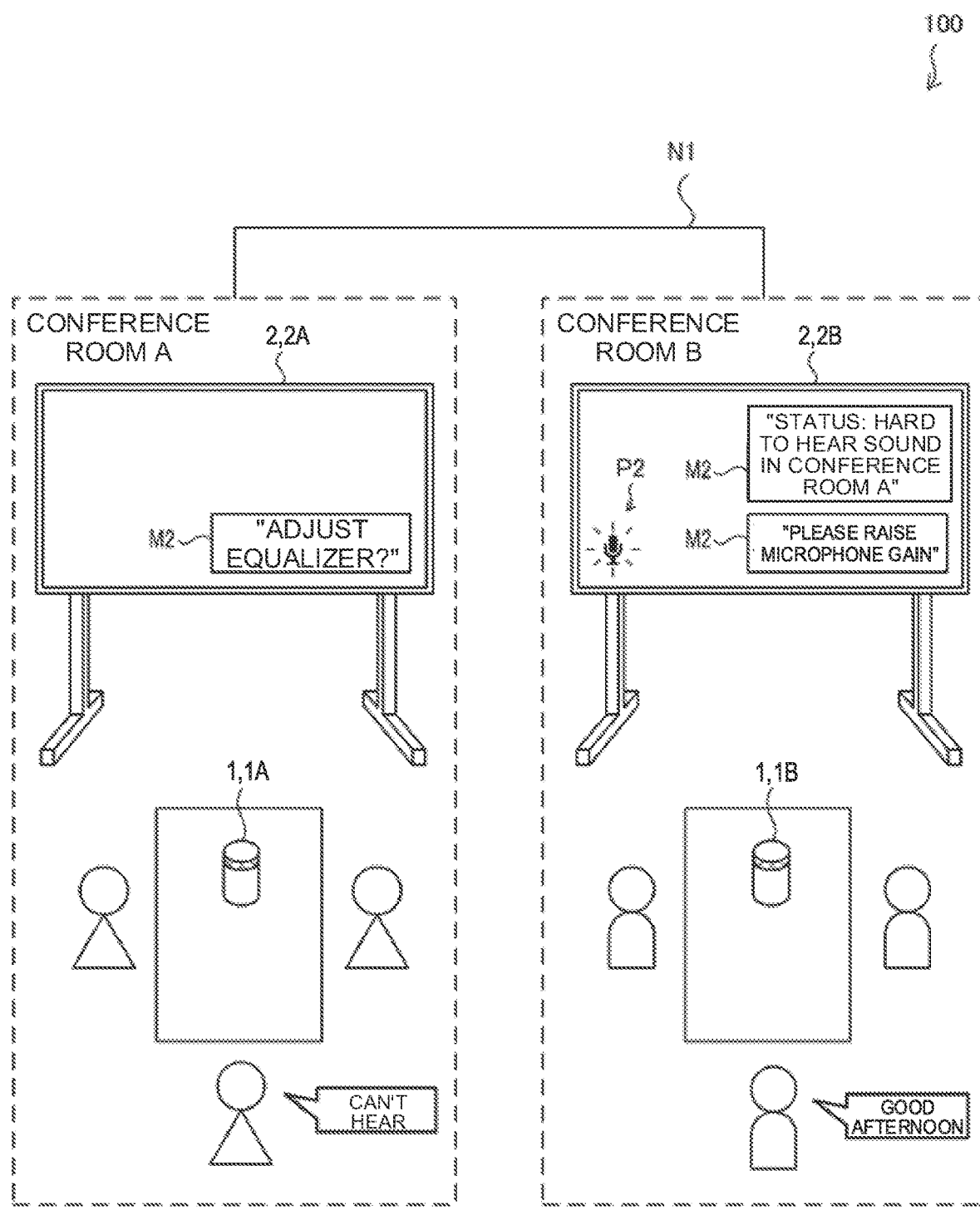
FIG. 8 is a diagram showing an example of a display screen displayed on a display device of a conferencing system according to an embodiment of the present disclosure.

Here, the specific information of the present disclosure is not limited to a troubleshooting message (see FIG. 5). For example, as shown in FIG. 8, the information presenting unit 115 may display an object image P2 based on which it is capable of identifying what is abnormal in the state of transmission and reception, on the display device 2. For example, when the set value of the microphone 14 of the voice processing device 1B is the cause of the trouble with the voice, the information presenting unit 115 of the voice processing device 1A causes the display device 2B to display the object image P2 (see FIG. 8) showing the microphone 14. In addition, the information presenting unit 115 may display, for emphasis, the object image P2 with highlighting or blinking. The object image P2 may be any image as long as it is capable of identifying what is abnormal in the state of transmission and reception based on the image, and examples thereof include an image showing a microphone, a speaker, a video, a network, and the like.

According to the above configuration, the user of the conference room B can easily recognize that the microphone 14 of the voice processing device 1B is the cause of the trouble with the voice.

Figure 11:
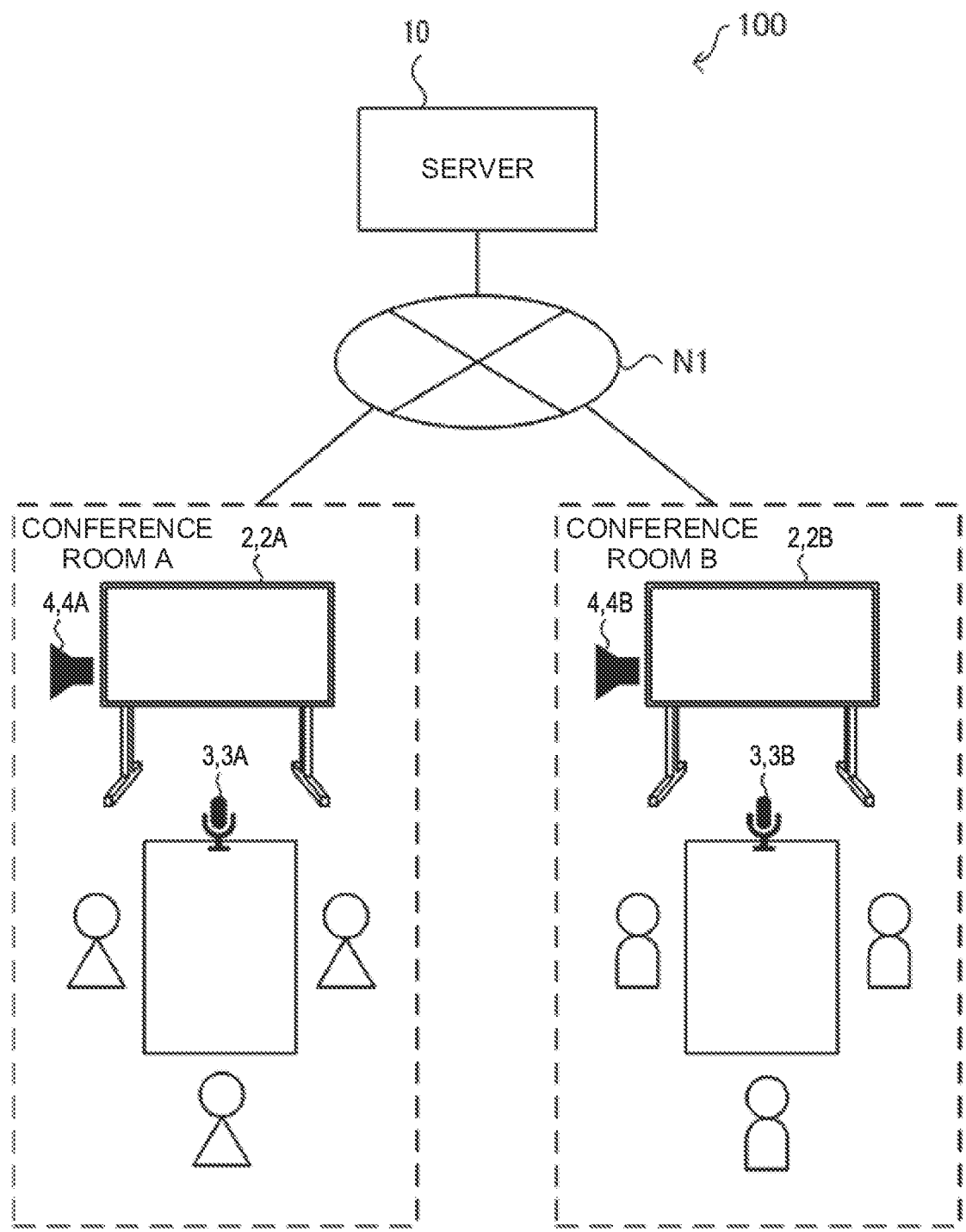
FIG. 11 is a diagram showing another schematic configuration of a conferencing system according to an embodiment of the present disclosure.

Also, the voice processing system of the present disclosure can be realized by including a server. For example, as shown in FIG. 11, the conferencing system 100 may include a server 10, a display device 2A, a microphone 3A, and a speaker 4A installed in the conference room A, and a display device 2B, a microphone 3B, and a speaker 4B installed in the conference room B. The server 10 includes a controller 11, a storage unit 12, a communications interface 15, and the like within the voice processing device 1 (see FIG. 2).

The server 10 determines the state of transmission and reception of the voice between the conference room A and the conference room B based on a recognition result of the first voice received from the conference room A and a recognition result of the second voice received from the conference room B, and when the server 10 determines that the state of transmission and reception is abnormal, the server 10 presents specific information to resolve the abnormal state of transmission and reception on the display devices 2A, 2B, and the like. That is, the server 10 shown in FIG. 11 is an example of the voice processing system of the present disclosure.

The voice processing system according to the present disclosure may freely combine the embodiments described above within the scope of the disclosure set forth in the claims, or may be configured by appropriately modifying or omitting parts of the embodiments.

What is claimed is:

1. A voice processing system that transmits and receives voice spoken by users in a first base and a second base connected via a network, the voice processing system comprising:
   a voice receiver that receives the voice;
   a voice recognition unit that recognizes the voice received by the voice receiver;
   a voice determination unit that determines a state of transmission and reception of the voice between the first base and the second base based on a recognition result of a first voice received from the first base and a recognition result of a second voice received from the second base; and
   an information presenting unit that, when it is determined by the voice determination unit that the state of transmission and reception is abnormal, presents specific information for resolving the abnormal state of transmission and reception, the specific information comprising a message relating to a troubleshooting method for resolving the abnormal state of transmission and reception.

2. The voice processing system according to claim 1, wherein the information presenting unit presents the specific information corresponding to a combination of a result showing whether the first voice is recognized by the voice recognition unit and content of a word acquired by recognizing the second voice by the voice recognition unit.

3. The voice processing system according to claim 1, wherein the voice determination unit determines the state of transmission and reception to be abnormal when a first word corresponding to the first voice is recognized by the voice recognition unit and a specific word set in advance corresponding to the second voice is recognized by the voice recognition unit, the specific word corresponding to a phrase indicating difficulty in hearing the first voice.

4. The voice processing system according to claim 3, wherein the information presenting unit presents, in the first base, the specific information based on at least either of a sound volume of a speaker provided in the second base and an amount of noise in the first voice received in the second base.

5. The voice processing system according to claim 1, wherein the voice determination unit determines the state of transmission and reception to be abnormal when a first word corresponding to the first voice is not recognized by the voice recognition unit and a specific word set in advance corresponding to the second voice is recognized by the voice recognition unit, the specific word corresponding to a phrase indicating difficulty in hearing the first voice.

6. The voice processing system according to claim 5, wherein the information presenting unit presents, in the first base, the specific information based on at least either of a bandwidth status of the network between the first base and the second base and an amount of noise in the first voice received by the second base.

7. The voice processing system according to claim 3, wherein the information presenting unit causes a first display panel provided in the first base to display the specific information.

8. The voice processing system according to claim 7, wherein the information presenting unit additionally causes a second display panel provided in the second base to display the specific information.

9. The voice processing system according to claim 1, wherein the specific information includes a message for resolving the abnormal state of transmission and reception and an object image based on which it is capable of identifying what is abnormal in the state of transmission and reception.

10. A voice processing method by which voice spoken by users is transmitted and received in a first base and a second base connected via a network,
   the voice processing method, by one or more processors, comprising:
   receiving the voice;
   recognizing the voice received;
   determining a state of transmission and reception of the voice between the first base and the second base based on a recognition result of a first voice received from the first base and a recognition result of a second voice received from the second base; and
   when it is determined that the state of transmission and reception is abnormal, presenting specific information for resolving the abnormal state of transmission and reception, the specific information comprising a message relating to a troubleshooting method for resolving the abnormal state of transmission and reception.

11. A non-transitory computer readable storage medium storing a voice processing program by which voice spoken by users is transmitted and received in a first base and a second base connected via a network,
   the voice processing program, by one or more processors, to cause performance of operations comprising:
   receiving the voice,
   recognizing the voice received,
   determining a state of transmission and reception of the voice between the first base and the second base based on a recognition result of a first voice received from the first base and a recognition result of a second voice received from the second base, and
   when it is determined that the state of transmission and reception is abnormal, presenting specific information for resolving the abnormal state of transmission and reception, the specific information comprising a message relating to a troubleshooting method for resolving the abnormal state of transmission and reception.

* * * * *